United States Patent
Challener et al.

(10) Patent No.: US 6,311,270 B1
(45) Date of Patent: Oct. 30, 2001

(54) METHOD AND APPARATUS FOR SECURING COMMUNICATION UTILIZING A SECURITY PROCESSOR

(75) Inventors: David Carroll Challener, Raleigh; Dhruv Manmohandas Desai, Cary, both of NC (US); Pankaj Rohatgi, Hartsdale; David Robert Safford, Brewster, both of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/152,591

(22) Filed: Sep. 14, 1998

(51) Int. Cl.[7] .................................................. G06F 1/24
(52) U.S. Cl. ......................... 713/169; 713/171; 380/255
(58) Field of Search ................................... 380/255, 277, 380/283, 285; 713/169, 171, 193, 194, 200, 201

(56) References Cited

U.S. PATENT DOCUMENTS

| | | | |
|---|---|---|---|
| 5,835,592 | * 11/1998 | Chang et al. | 380/21 |
| 5,850,450 | * 12/1998 | Schweitzer et al. | 380/30 |
| 5,943,422 | * 8/1999 | Wie et al. | 380/5 |
| 5,949,876 | * 9/1999 | Ginter et al. | 380/4 |
| 5,987,131 | * 11/1999 | Clapp | 380/21 |
| 5,991,406 | * 11/1999 | Lipner et al. | 380/21 |

OTHER PUBLICATIONS

Schneier, "Applied Cryptography", 1995, pp. 71, 180, 587.*

* cited by examiner

Primary Examiner—Thomas R. Peeso
(74) Attorney, Agent, or Firm—J. Bruce Schelkopf; Bracewell & Patterson, LLP (57) ABSTRACT

A method is provided for communicating digital content between a content provider and a data processing system which is under the control of a content consumer, utilizing an insecure communication channel, such as the internet. A security processor is provided. The security processor is communicative coupled to the data processing system of the consumer. The security processor receives and preprocesses encrypted digital content received from the insecure communication channel. The security processor includes a central processing unit for executing program instructions contained in digital content. The security processor includes a shared-secret decryption engine for receiving encrypted content and for utilizing a shared-secret key for producing decrypted digital content. Furthermore, the security processor includes a memory means for maintaining securely the shared-secret key within the security processor. This memory means is preferably secure from reverse engineering, whether electrical reverse engineering or mechanical reverse engineering. A security program is provided which is loaded onto the security processor and which is executable by the security processor. The security program includes a shared-secret encryption engine for receiving input and for utilizing the shared-secret key to produce cypheroutput based upon the input. The security program further includes a public key-private key decryption engine for receiving an encrypted input and utilizing a known public key and a private key to generate a decrypted output. Communications over the insecure communication channel between the content provider and the security processor are conducted utilizing the public key-private key algorithm, while communications between the security program and the security processor are conducted utilizing the shared-secret encryption protocol.

10 Claims, 13 Drawing Sheets

METHOD AND APPARATUS FOR SECURING COMMUNICATION UTILIZING A SECURITY PROCESSOR

BACKGROUND OF THE INVENTION

1. Field of the Invention

The present invention relates in general to cryptographic techniques for securing electronic communications, and in particular to a cryptographic protocol which may be utilized in combination with a security processor in order to secure the transmission of communications over an insecure communication channel, such as the internet.

2. Description of the Prior Art

Currently, the internet is receiving increased attention as a medium for providing content to consumers and other end users. The content may comprise sound or video recordings, computer programs, computer games, news and information such as electronic magazines, stock information, and the like. Additionally, the internet is being used increasingly for the conduct of electronic commerce, which results in transactions which include order and payment information which are communicated over the insecure communication channel of the internet. A variety of technologies are being developed in order to further facilitate the communication of content and to facilitate the conduct of electronic commerce over the internet, cable, satellites and other insecure communication channels.

In accordance with one prior art technique, a special purpose security processor has been developed which is installed in the data processing system which is under the control of a content consumer, which serves a "gate keeping" function within the consumer's data processing system in order to receive encrypted content, decrypt the content, execute program instructions, and pass the digital content on to the data processing system for further processing and utilization by the consumer. The prior art security processor includes a microcontroller, an on-board ROM and RAM, a cryptographic module (such as a triple DES engine), a real-time clock, and an interface system. It utilizes a shared-secret encryption algorithm to encrypt the content before it is passed over the internet to the consumer. Upon receipt at the consumer's data processing system, the security processor utilizes the encryption engine and the shared-secret key which is maintained in memory in the security processor in order to decrypt the content and to pass it to the consumer's data processing system for further processing.

Systems which operate on shared-secret key cryptographic protocols are of special interest to hackers, since a key library must be maintained in confidence for the protocol to be effective. The key library maintained by the content provider provides an attractive target for hackers, especially when consumer content such as computer programs, audio recordings, video recordings have considerable market value and are subject to considerable amounts of piracy in general.

The present invention is an improved protocol for use in combination with the prior art security processor devices which enhances the overall security.

SUMMARY OF THE INVENTION

It is one objective of the present invention to provide an enhanced security protocol which may be utilized in combination with prior art security processors in order to enhance overall security of content and information passed between a content provider and a content consumer.

It is another objective of the present invention to provide an improved method and apparatus for communicating content between a content provider and a data processing system which is under the control of a content consumer, to allow communication over an insecure communication channel, wherein a public-private key cryptographic protocol is utilized in communications between the content provider and the data processing system under the control of the content consumer, and wherein shared-secret key encryption protocols are utilized to control communications between a security processor maintained in the data processing system under the control of the content consumer and the data processing system itself.

These and other objectives are achieved as is now generally described. A security cryptographic protocol is provided to allow communication between a content provider and a content consumer. The content consumer utilizes a data processing system in order to process digital content. The content provider utilizes an insecure communication channel, such as the internet, in order to pass encrypted communications, including executable program instructions and digital content, to the content consumer. A security processor is provided and installed in the data processing system which is under the control of the content consumer. The security processor receives and preprocesses encrypted content received over the insecure communication channel. Preferably, the security processor includes a central processing unit for executing program instructions contained in the digital content. Furthermore, the security processor preferably includes a hard-ware based shared-secret decryption engine for receiving encrypted content and for utilizing a shared-secret key for producing decrypted content. Furthermore, the security processor includes a memory means for maintaining securely the shared-secret key within the security processor. Preferably, the shared-secret key is maintained in memory in a manner which renders it insusceptible to reverse engineering in order to determine its identity. In other words, the security processor is manufactured in a manner which destroys the content of the memory location for the shared-secret key when the chip is reverse-engineered. In accordance with the present invention, a security program is also provided which is loaded onto the security processor. The security program is executable by the security processor. The security program includes a shared-secret encryption engine for receiving an input and for utilizing the shared-secret key to produce a cypheroutput based upon the input. Additionally, the security program includes a public key-private key decryption engine for receiving an encrypted input and utilizing a known public key and a secure private key to generate a decrypted output.

In accordance with the present invention, a public key-private key encryption protocol is utilized to secure communications over the insecure communication channel between the content provider and the security program which is resident in the security processor. This allows content to be passed over the insecure communication channel utilizing the public key-private key encryption protocol which is generally considered to be more secure than the shared-secure key protocol. In accordance with the preferred embodiment of the present invention, the public-private key decryption engine of the security program is utilized to receive and decrypt the encrypted content. Additionally, and in accordance with the preferred embodiment of the present invention, the communication between the security program and the security processor is secured utilizing the shared-secret encryption protocol. In accordance with the present invention, the shared-secret encryption engine of the security program is utilized to encrypt the content utilizing the shared-secret key prior to passage of the content to the security processor. Upon receipt of the encrypted content, the security processor utilizes the shared-secret key and the encryption engine to decrypt the content changing it from cyphertext to plain text, prior to passing the content to the central processing unit of the security processor for execution of the program instructions. The security processor will interact with the consumer's data processing system to allow processing in a manner which allows the consumer to utilize the digital content.

DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF THE PREFERRED EMBODIMENT

Figure 1:
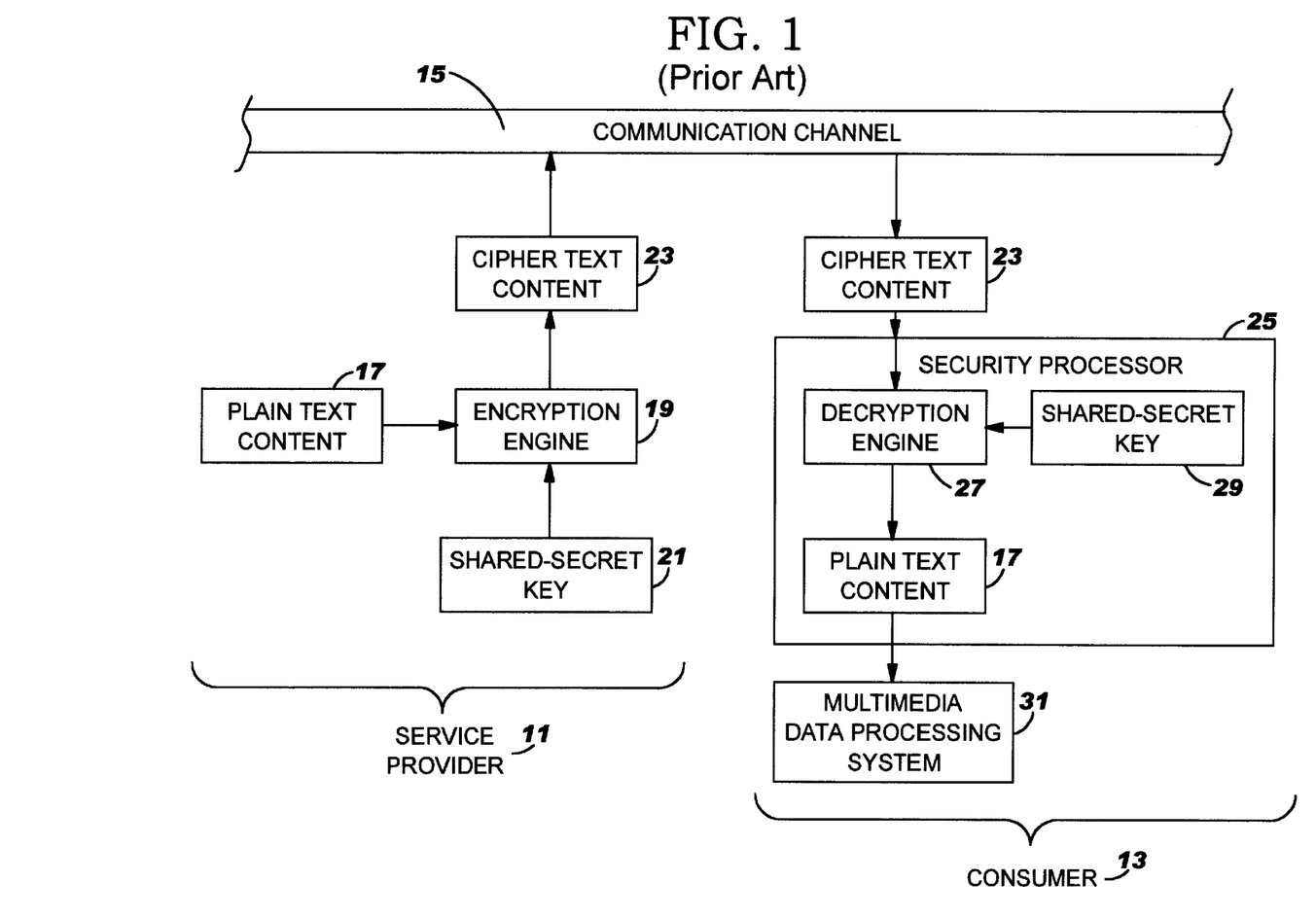
FIG. 1 is a block diagram representation of the prior art technique of utilizing a security processor and a shared-secret encryption protocol to pass digital content over an insecure communication channel.

FIG. 1 is a block diagram representation of one prior art technique for securing the transmission of information, such as digital content, to allow transmission over an insecure communication channel such as the internet, a cable system, or a satellite transmission system. One goal of the prior art system is to communicate plain text content 15 from service provider 11 to multimedia data processing system 31 under the control of consumer 13 utilizing communication channel 15. As is shown, service provider 11 provides plain text content 17 to encryption engine 19. Encryption engine 19 utilizes shared-secret key 21 in one or more predetermined encryption operations to produce cyphertext content 23 as an output. Cyphertext content 23 is communicated over insecure communication channel 15 and is received as an input at security processor 25. Security processor 25 provides the cyphertext content 23 as an input to decryption engine 27. One or more decryption algorithms are keyed utilizing shared-secret key 29 in a predetermined manner in order to generate plain text content 17. The plain text content 17 is executed by a CPU and digital content is provided as an input to multimedia data processing system 31.

Figure 2:
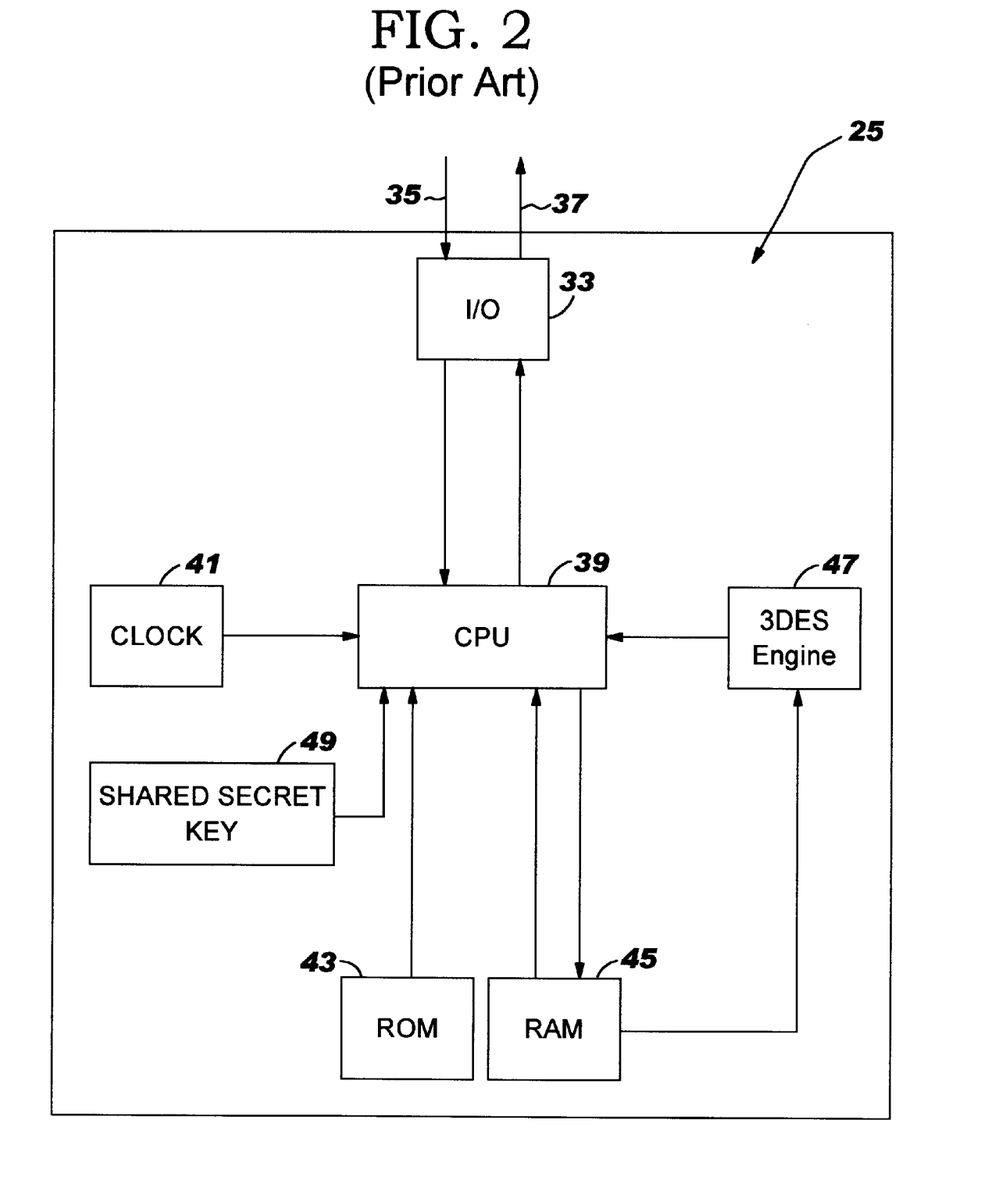
FIG. 2 is a block diagram representation of a prior art security processor which is utilized in accordance with the preferred embodiment of the present invention.

FIG. 2 is a block diagram representation of prior art security processor 25 of FIG. 1. As is shown, security processor 25 includes an input/output system 33 which receives incoming data streams 35 and which transmits output data stream 37. Security processor 25 further includes central processing unit 39 (which is preferably a microcontroller, which is a relatively low cost data processing device) which is communicatively coupled to input/output system 33. Real-time clock 41 provides clock input to CPU 39. Additionally, CPU 39 is communicatively coupled to ROM 43 and RAM 45. Security processor 25 further includes an encryption engine, such as a triple DES engine 47. Furthermore, security processor 25 includes a memory means 49 for maintaining shared-secret key 49 in a manner which is secure from reverse engineering, including electrical and/or mechanical reverse engineering. In other words, attempts to physically or electrically obtain the content of shared-secret key 49 will result in destruction of that information.

Figure 3:
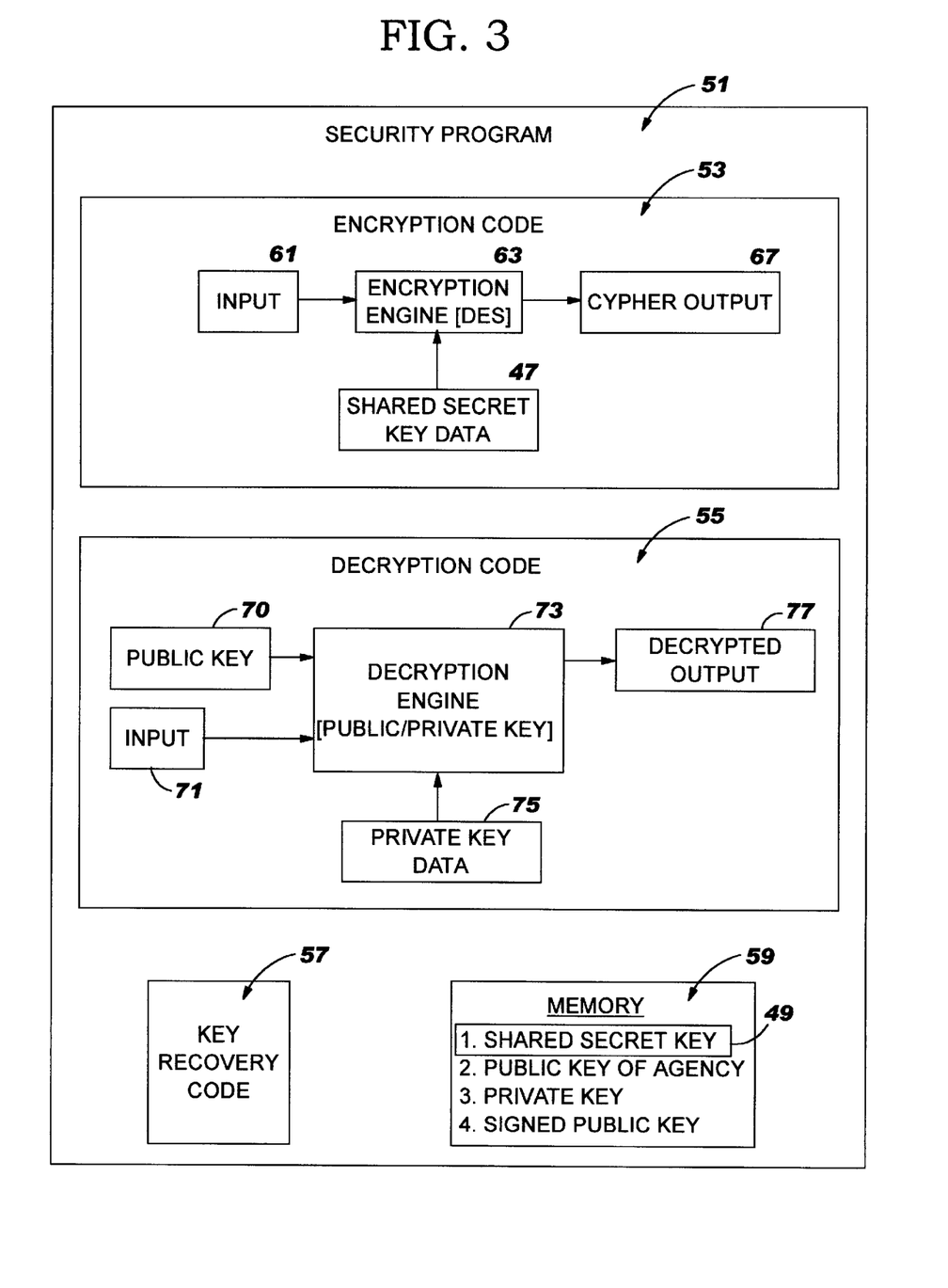
FIG. 3 is a block diagram representation of a security program in accordance with the preferred embodiment of the present invention which cooperates with the security processor of FIG. 2 in order to implement the preferred embodiment of the present invention.

FIG. 3 is a block diagram representation of a security program 51 which is coded in accordance with the preferred embodiment of the present invention and which cooperates with the security processor 25 of FIG. 2 in order to implement the preferred embodiment of the present invention. Security program 31 includes an encryption code module 53, a decryption code module 55, a key recovery code module 57, and memory 59. The encryption code module 53 is adapted to receive an input 61, and supply the input 61 to an encryption engine 63, such as a DES encryption engine. The encryption engine is keyed with a shared-secret key data element 47. The output of encryption engine 63 is a cypher-output 67. The shared-secret key data 47 is a shared-secret key which is generated at manufacture and assigned to a particular security processor 25. Decryption code module 55 includes a decryption engine 73 which is preferably a public key-private key decryption engine which receives as an input public key 70 and a cyphertext input 71. Decryption engine is keyed with the content of private key data 75 which is known only by security program 51. The decryption engine 73 provides a deciphered output 77. Key recovery code 57 may be utilized to recover the contents of memory 59 which include the shared-secret key, the public key of the agency, the private key of security program 51, and the assigned public key of the service provider. The operation of the key recovery code module 57 will be discussed later.

The security processor 25 and security program 51 cooperate in a manner which allows for the use of a public key-private key encryption protocol to be utilized for communications of executable instructions and digital content over the insecure communications channel 15, such as the internet, but which also utilizes the shared-secret key encryption protocol within security processor 25 to moderate the execution of code by security processor 25. Put another way, the present invention allows for the utilization of the prior art security processor 25 (of FIG. 2) without requiring any changes to the software or hardware of security processor 25, while simultaneously allowing the use of private key-public key encryption protocols to further enhance security. The public key-private key encryption protocol is considered superior to a shared-secret key encryption protocol since it is not necessary to generate and maintain a key library for the public key-private key encryption protocol as is necessary for a shared-secret encryption protocol. The very existence of a database of shared-secret keys presents a security risk. In accordance with the present invention, the system is secure from hacker attacks, since a hacker would have to (1) defeat the public key-private key encryption protocol and (2) gain access to the key library for the shared-secret keys, in order to gain access to the digital content. In tandem, the combination of the public key-private key encryption protocol and the shared-secret encryption protocol present a formidable barrier to hacker attacks.

Figure 4A:
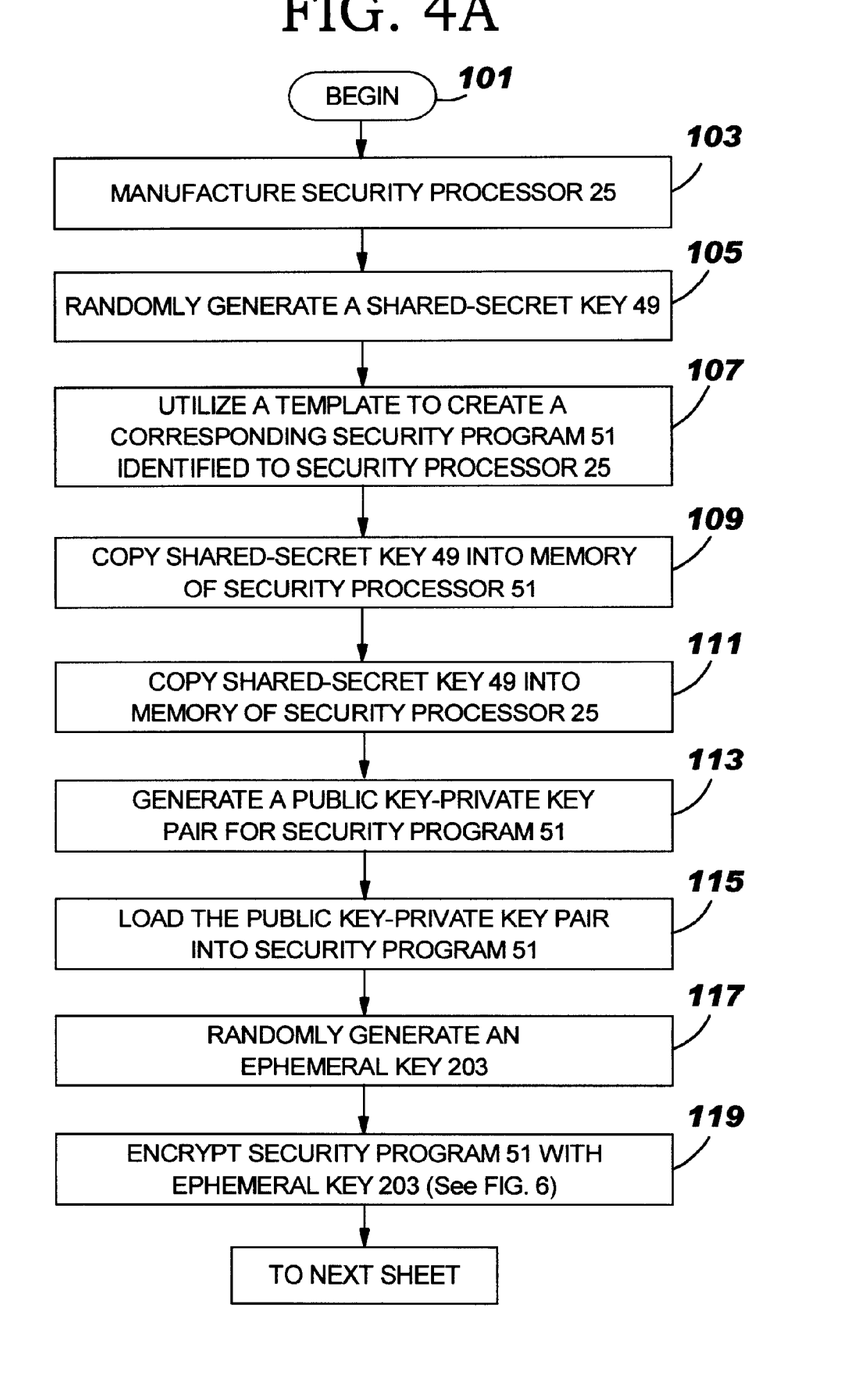
FIG. 4 is a flowchart representation of the steps implemented in accordance with the preferred embodiment of the present invention in order to allow for the coordinated operation of a security processor and a security program.
Figure 4B:
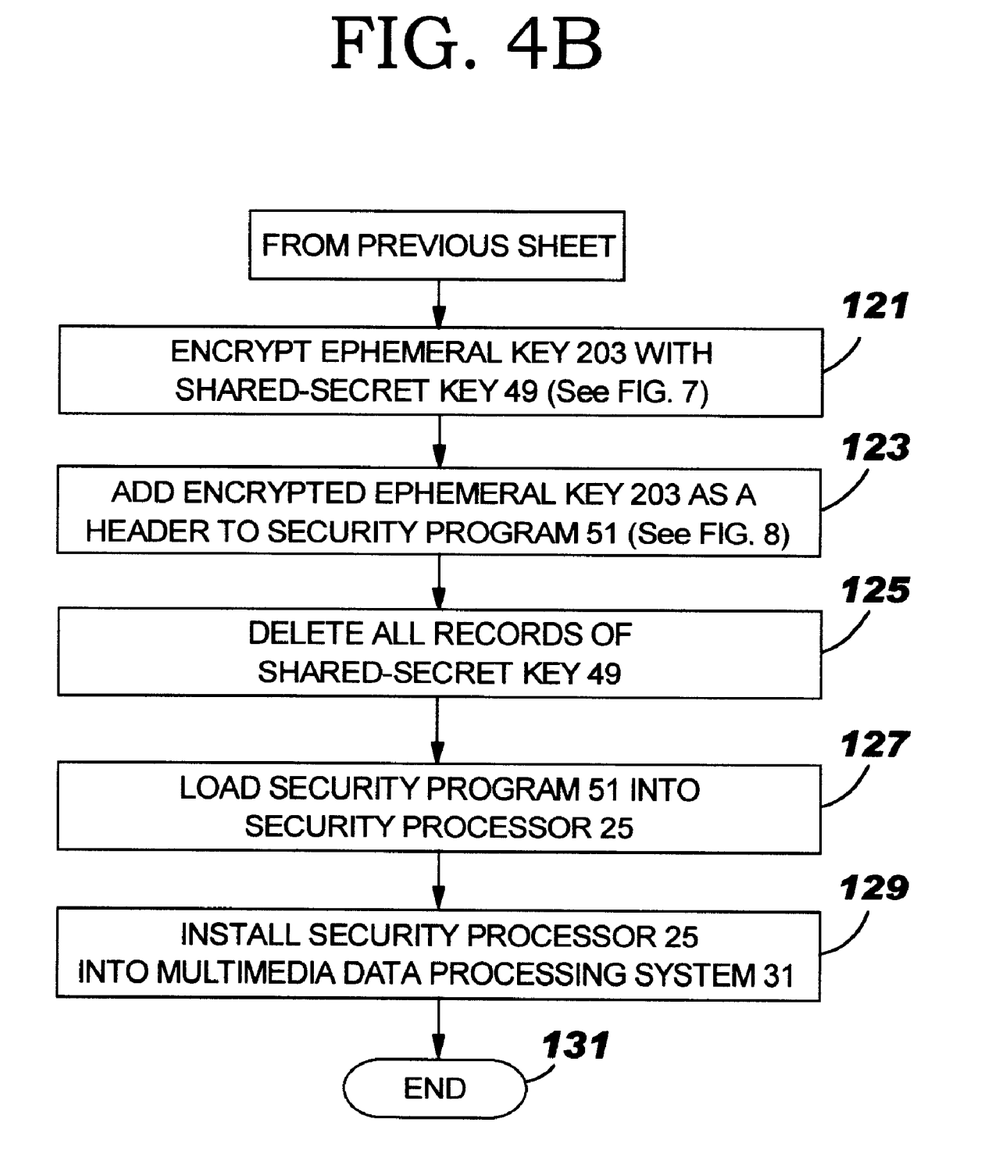
Figure 6:
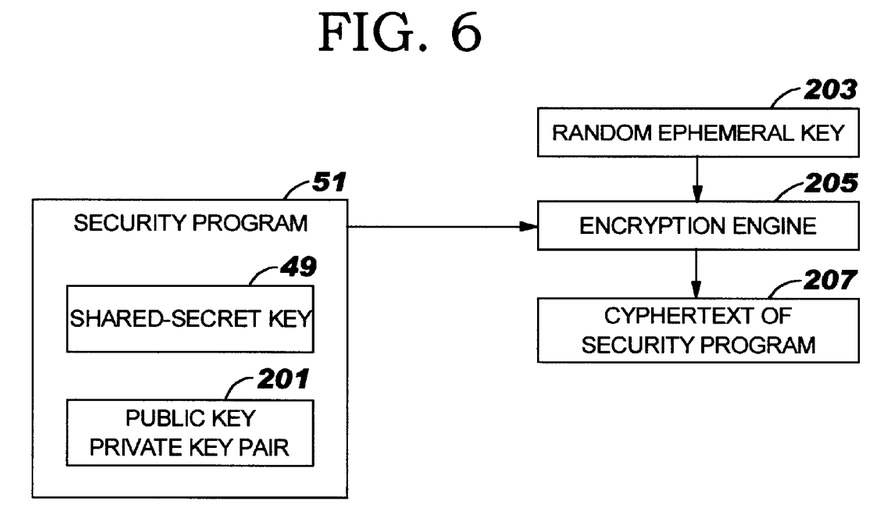
FIG. 6 is a block diagram representation of encryption of the security program in accordance with the preferred embodiment of the present invention.

FIG. 4 is a flowchart representation of the steps performed in accordance with the preferred embodiment of the present invention to allow for the coordinated operation of a security processor 25 and a security program 51. The process begins at block 101, and continues at block 103, wherein security processor 25 is manufactured. As part of the manufacturing process, and in accordance with block 105, a shared-secret key 49 is randomly generated. This shared-secret key 49 is thereafter associated with the particular security processor 25. Next, in accordance with block 107, a template is utilized to create a corresponding security program 51, which is also identified to security processor 25. In accordance with step 109, the shared-secret key 49 is copied into memory of the security program 51; also, in accordance with step 111, the shared-secret key 49 is copied into memory of security processor 25. Then, in accordance with block 113, a public key-private key pair is generated for use by security program 51. In accordance with block 115, the public key-private key pair is loaded into security program 51. In accordance with step 117, an ephemeral key 203 is then randomly generated. As set forth in step 119, security program 51 is then encrypted utilizing ephemeral key 203. This step is depicted in block diagram form in FIG. 6. As shown in FIG. 6, security program 51 carries within it shared secret key 49 and public key-private key pair 201. Security program 51 is supplied as an input to encryption engine 205. Random ephemeral number 203 is utilized as a key for encryption engine 205. The output of encryption engine 205 is cyphertext of security program 207.

Figure 7:
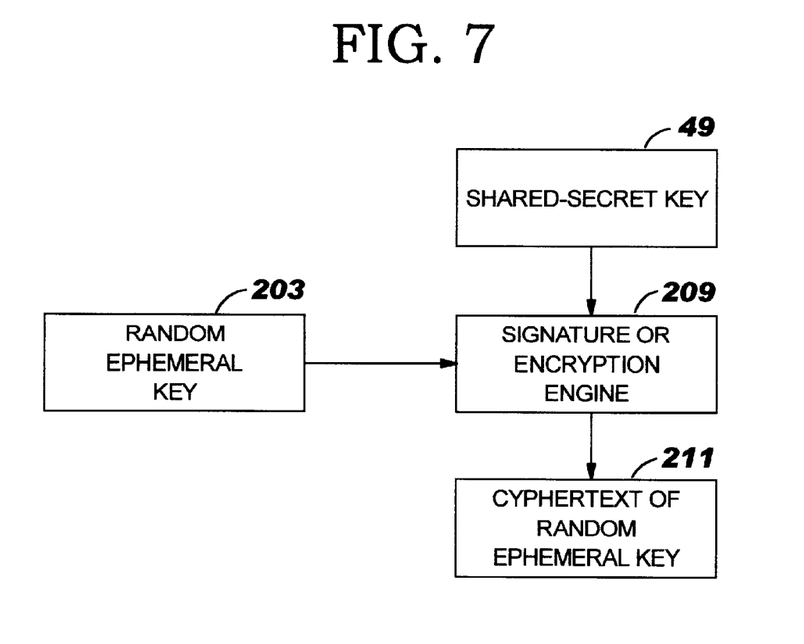
FIG. 7 is a block diagram representation of encryption of a random ephemeral key which was utilized in encrypting the security program, in accordance with the preferred embodiment of the present invention.
Figure 8:
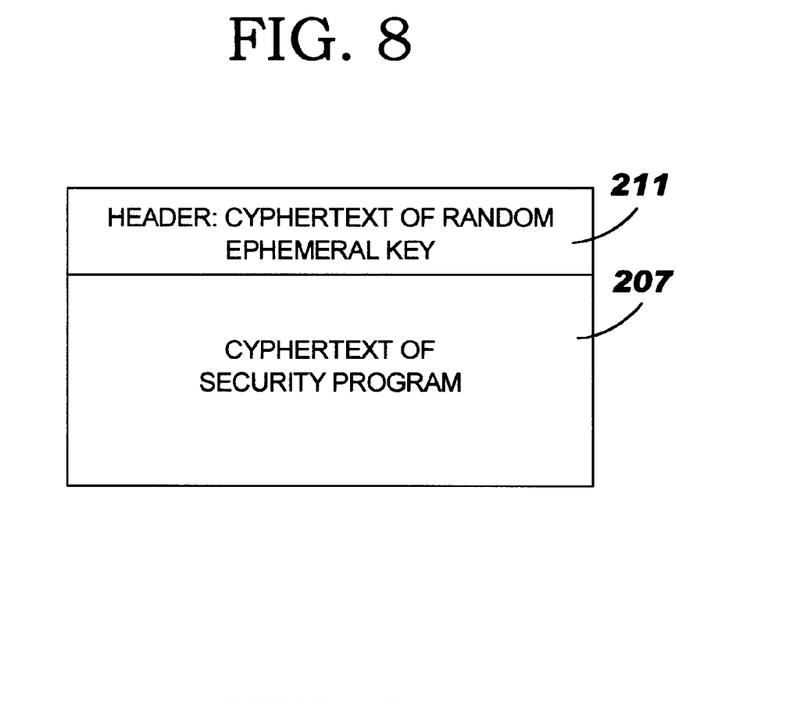
FIG. 8 is a pictorial representation of the combination "header" and cyphertext of the security program in accordance with the preferred embodiment of the present invention.

Returning now to FIG. 4, as set forth in step 121, the ephemeral key 203 is then encrypted utilizing the shared secret key 49. This step is depicted in block diagram form in FIG. 7. As is shown in FIG. 7, random ephemeral key 203 is supplied as an input to signature or encryption engine 209. The signature or encryption engine 209 is keyed with the shared-secret key 49. Signature or encryption engine 209 provides as an output cyphertext of the random ephemeral key 211. In accordance with the step 123 of FIG. 4, and is also depicted in FIG. 8, the cyphertext of the random ephemeral key 211 is combined or added to the cyphertext of security program 207.

Returning again to FIG. 4, as is shown in step 125, all records of the shared-secret key 49 are then deleted. Neither the content provider nor the consumer has any record of the shared-secret key 49. With the sole exception of the key recovery code module 57 of FIG. 3, neither the service provider nor the consumer has the ability to reverse engineer or otherwise determine the content of the shared-secret key. Next, in accordance with step 127, the security program 51 is loaded onto memory of the security processor 25. Then, in accordance with block 129, the security processor 25 is installed into the multimedia data processing system 31 of a particular customer, and the process ends at block 131. In accordance with the preferred embodiment, the security processor and security program are also loaded with a known chip identification number. This is used for key recovery operations and could be used for non-confidential communications.

Figure 5:
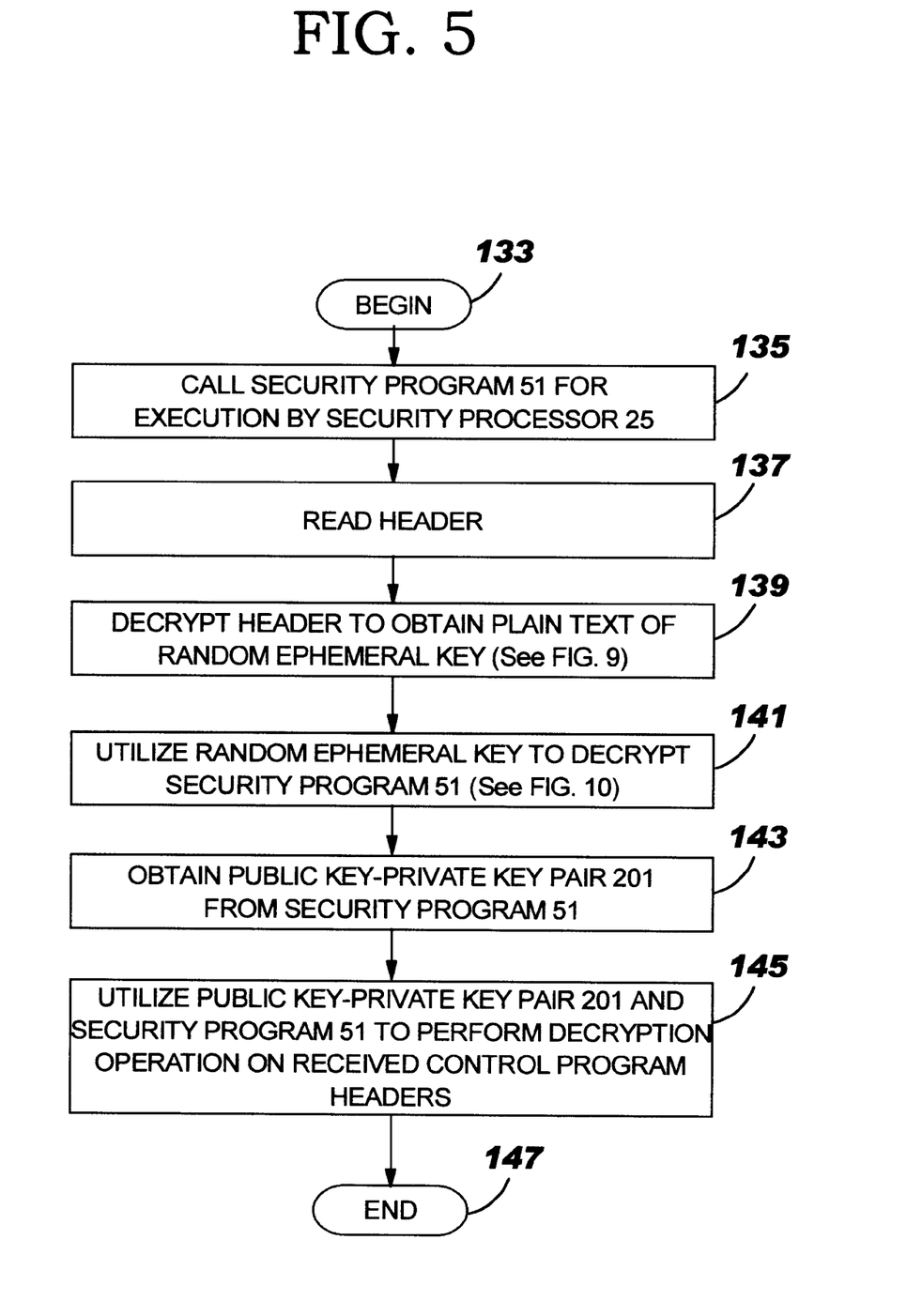
FIG. 5 is a flowchart representation of data processing implemented steps performed by the security processor to allow coordinated operation of the security processor and the security program, in accordance with the preferred embodiment of the present invention.
Figure 9:
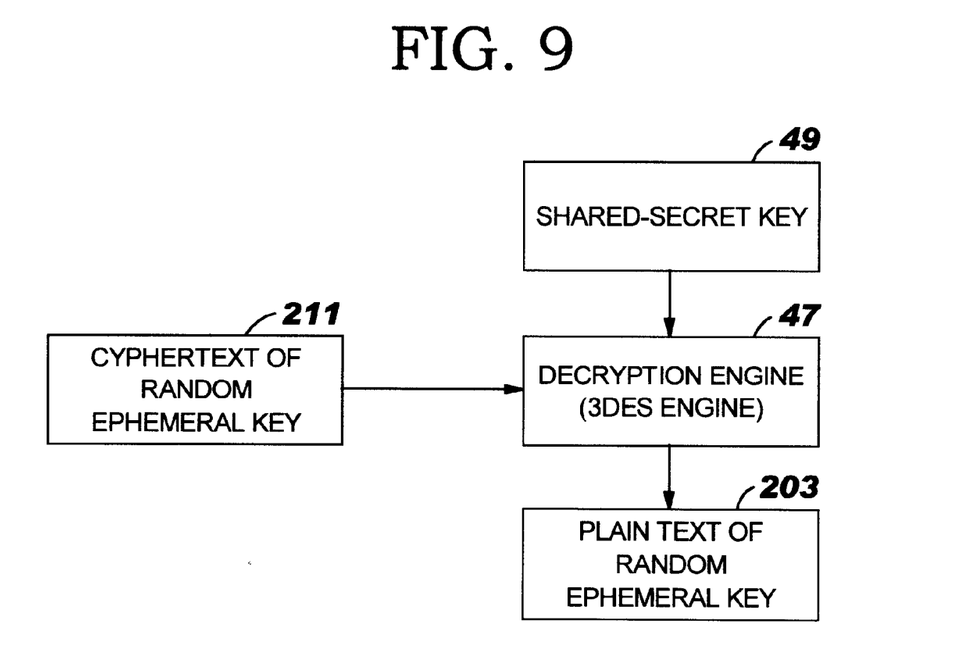
FIG. 9 is a block diagram representation of the encryption of the "header" associated with a particular security program in accordance with the preferred embodiment of the present invention.

FIG. 5 is a flowchart representation of data processing implemented steps performed by the security processor 25 when prompted to operation by receipt of digital content. The process begins at step 131, and continues at step 135, wherein the security program 51 is called for execution by security processor 25. In accordance with block 137, security processor 25 reads the "header" associated with security program 51. Next, in accordance with block 139, security processor 25 decrypts the "header" to obtain plaintext of the random ephemeral key 203 (of FIG. 6) which has previously been utilized to encrypt security program 51. This process is depicted in block diagram form in FIG. 9. As is shown, the cyphertext of random ephemeral key 211 is supplied as an input to decryption engine (preferably the triple DES engine which is in hardware of security processor 25). Decryption engine 47 is keyed with shared-secret key 49 which is also maintained in memory of security processor 25. The output of decryption engine 47 is plain text of the random ephemeral key 203.

Figure 10:
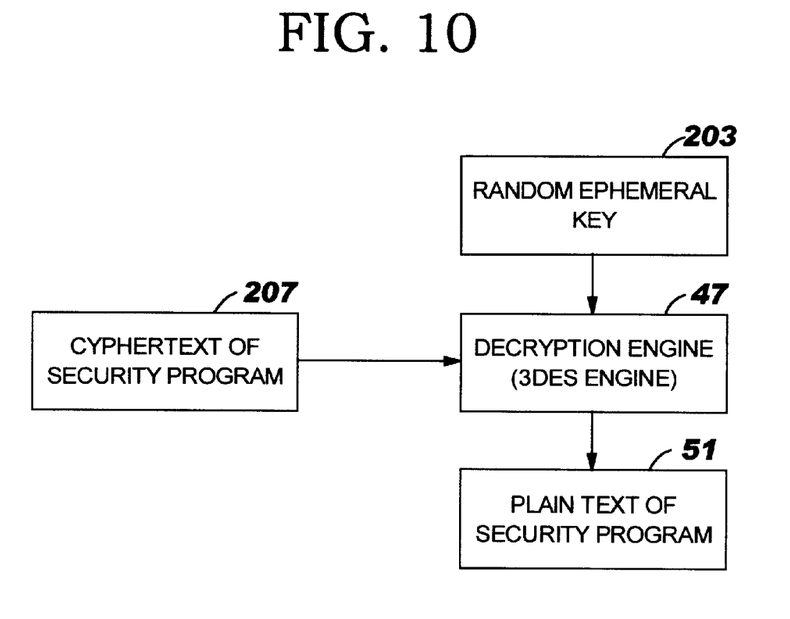
FIG. 10 is a block diagram representation of decryption of the cyphertext of the security program in accordance with the preferred embodiment of the present invention.

Returning now to FIG. 5, in accordance with block 141, the random ephemeral key 203 is then utilized to decrypt the cyphertext content of security program 51. This is also depicted in block diagram form in FIG. 10. As is shown in FIG. 10, cyphertext of security program 207 is supplied as an input to decryption engine 47 (once again, preferably the triple DES engine of security processor 25). Decryption engine 47 is keyed with random ephemeral key 203. Decryption engine 47 provides as an output the plaintext of security program 51.

Returning once again to FIG. 5, as is set forth in step 143, the public key-private key pair 201 is obtained from security program 51. Next, in accordance with step 145, the public key-private key pair 201 and security program 51 are utilized to perform decryption operations on control programs which are received. In accordance with the preferred embodiment of the present invention, the control programs include executable instructions and digital content. The process ends at block 147.

Figure 11:
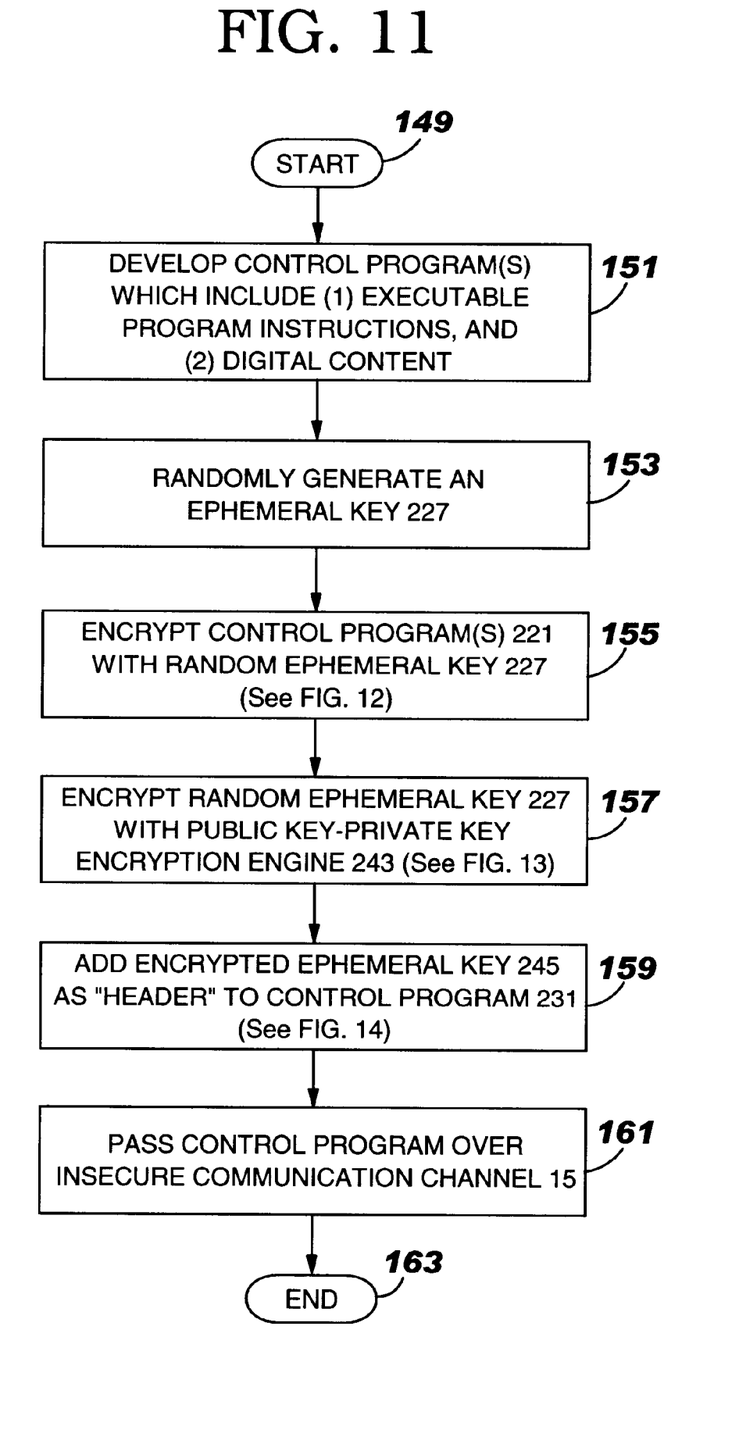
FIG. 11 is a flowchart representation of data processing implemented steps of utilizing control programs to pass executable instructions and digital content to the security processor, in accordance with the preferred embodiment of the present invention.
Figure 12:
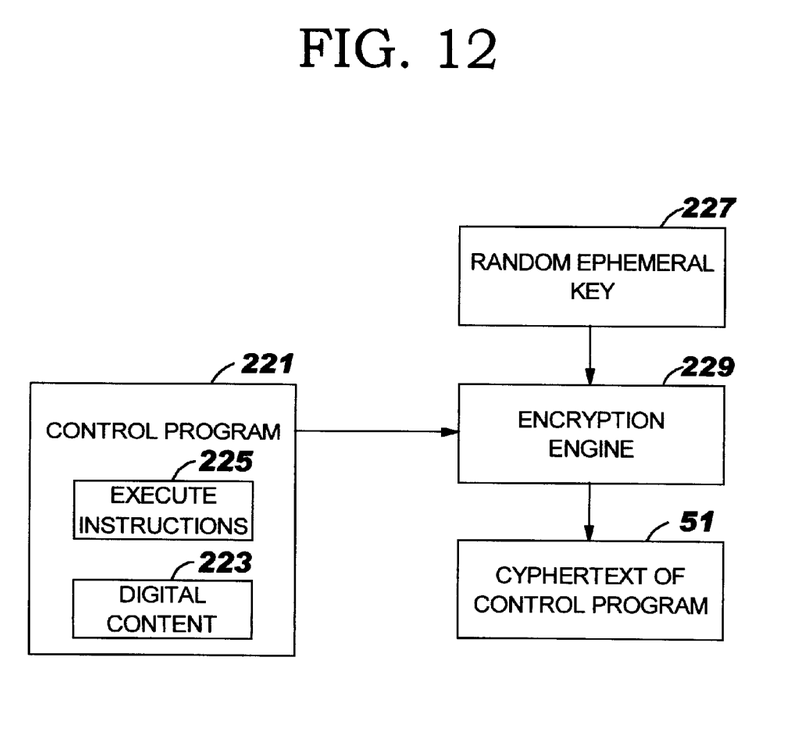
FIG. 12 is a block diagram representation of encryption of a control program in accordance with the preferred embodiment of the present invention.

FIG. 11 is a flowchart representation of the preferred embodiment of generating, encrypting, and communicating control programs. The process begins at block 149, and continues at block 151, wherein one or more control programs are developed which include executable program instructions and digital content. Next, in accordance with block 153, an ephemeral key 227 is randomly generated. Then, in accordance with block 155, the control program 221 is encrypted utilizing the random ephemeral key 227. This process is depicted in block diagram form in FIG. 12. As is shown in FIG. 12, control program 221 carries within it executable instructions 225 and digital content 223. The control program 221 is supplied as an input to encryption engine 229. Encryption engine 229 is keyed with random ephemeral key 227. The output of encryption engine 229 is cyphertext of control program 245.

Figure 13:
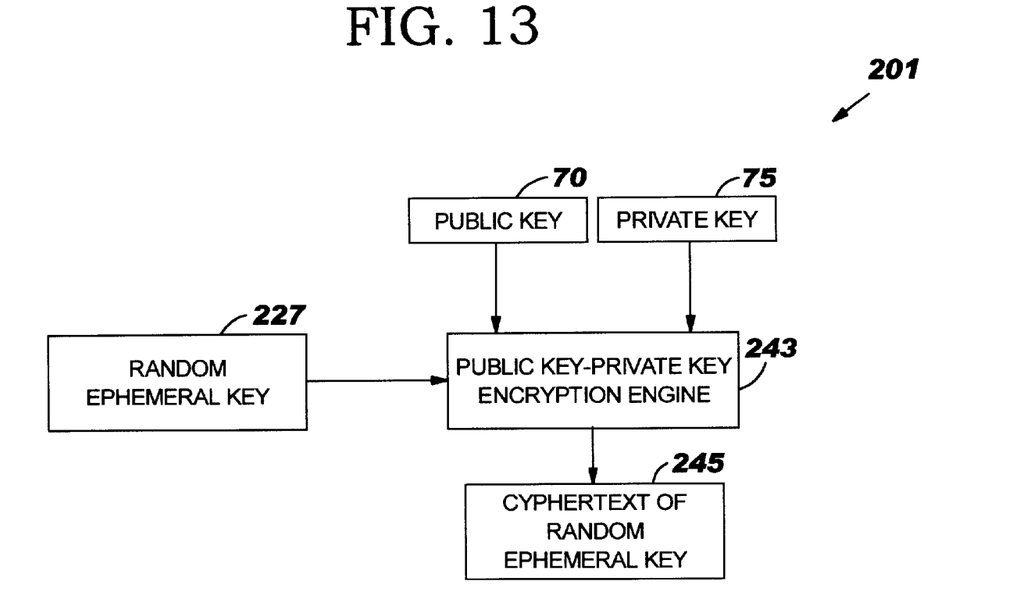
FIG. 13 is a block diagram representation of public key-private key encryption of an ephemeral key, which has previously been utilized to encrypt a control program, all in accordance with the preferred embodiment of the present invention.
Figure 14:
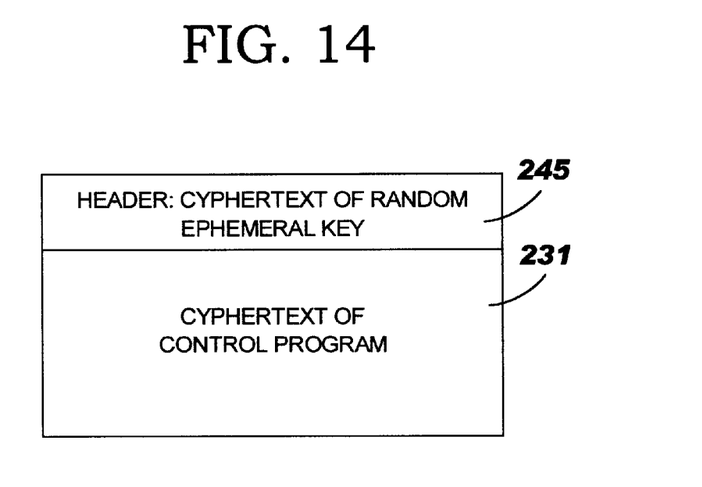
FIG. 14 is a pictorial representation of the combined "header" and cyphertext of a control program.

Returning to FIG. 11, in accordance with block 157, the random ephemeral key 227 is then encrypted utilizing a public key-private key encryption engine 243. This process is depicted in block diagram form in FIG. 13. As is shown, random ephemeral key 227 is supplied as an input to public key-private key encryption engine 243. The public key-private key encryption engine 243 is keyed utilizing public key 70 and private key 75 of public key-private key pair 201. Public key-private key encryption engine 243 provides as an output cyphertext of random ephemeral key 245. Returning once again to FIG. 11, the process continues at block 149, wherein the encrypted ephemeral key 245 is added as a "header" to cyphertext of control program 231. This is depicted in block diagram form in FIG. 14, which shows the combination of header 245 and cyphertext of control program 231. Returning again to FIG. 11, the process continues at block 161, wherein the control program (including the header and the cyphertext are passed over an insecure communication channel 15 to a particular customer), the process ends at block 163.

Figure 15:
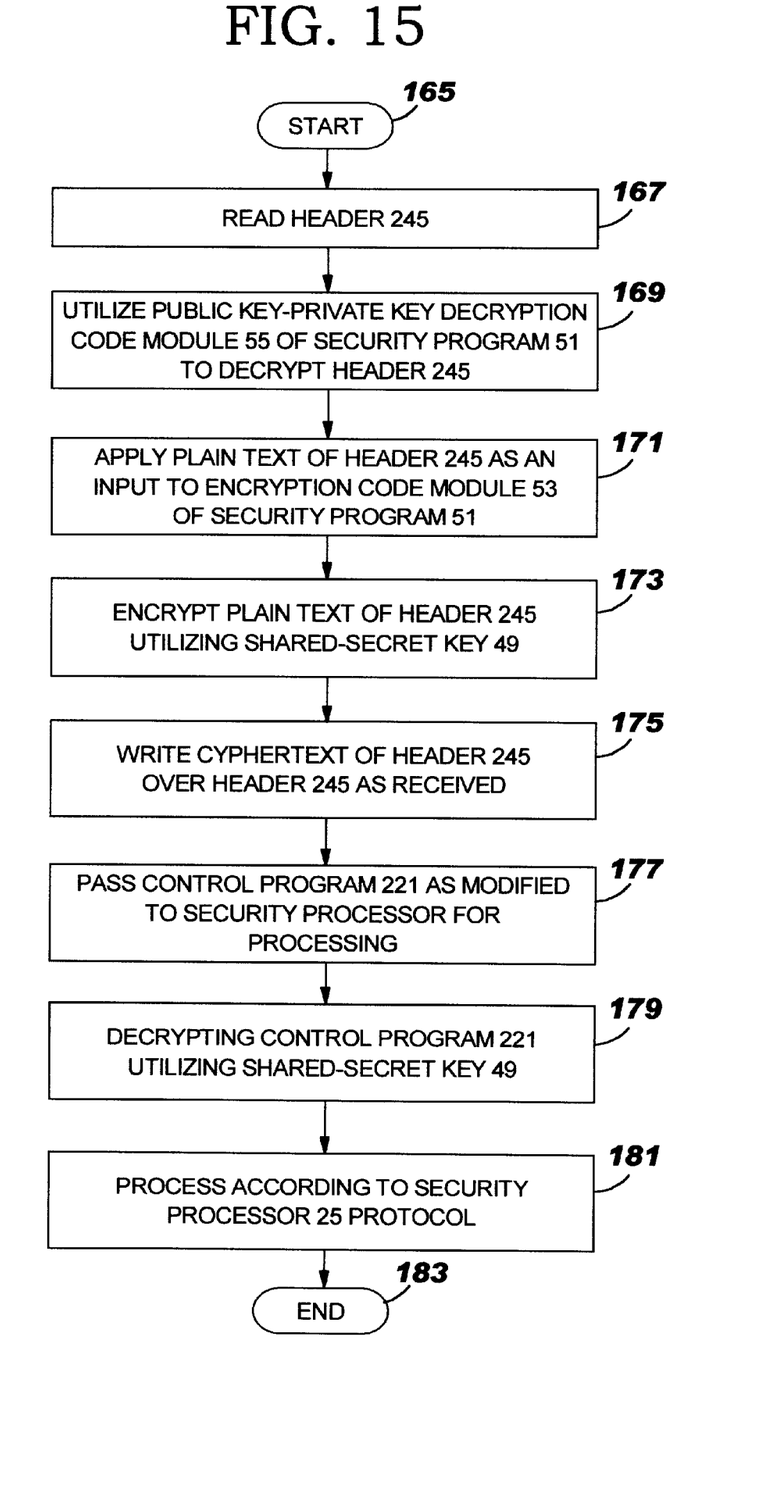
FIG. 15 is a flowchart representation of the data processing implemented steps of receiving and processing a particular control program, in accordance with the preferred embodiment of the present invention.
Figure 16:
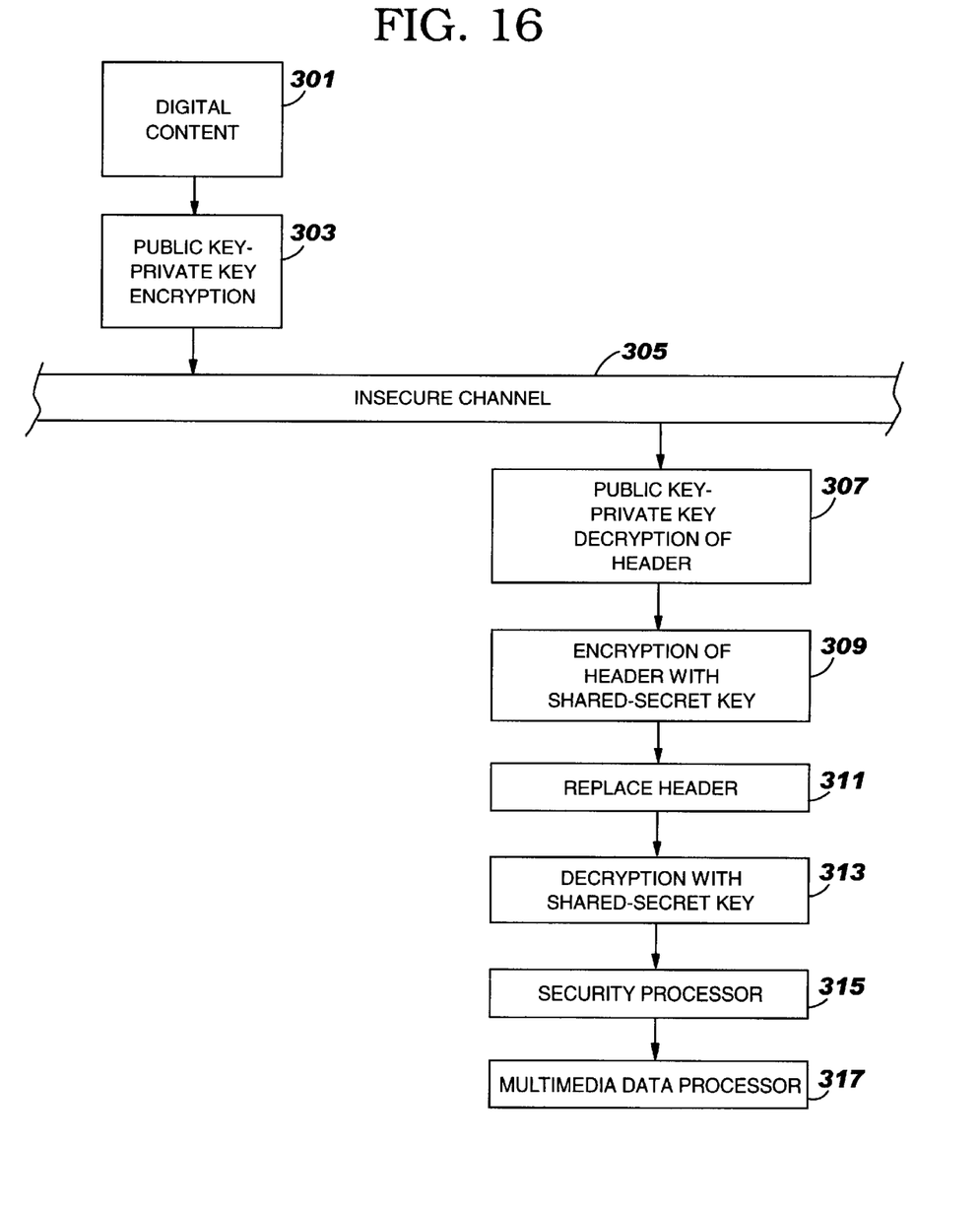
FIG. 16 is a pictorial and block diagram representation of a broad overview of a process of passing digital content over an insecure communication channel in accordance with the preferred embodiment of the present invention.

FIG. 15 is a flowchart representation of the data processing implemented steps performed by the security processor 25 and security program 51 in accordance with the preferred embodiment of the present invention. The process commences at block 165, and continues at block 167, wherein the "headers" 245 is read by security processor 25. Next, in accordance with block 169, the public key-private key decryption code module 55 of security program 51 is utilized to decrypt header 245. Then, in accordance with block 171, the plain text of header 245 is supplied as an input to encryption code module 53 of security program 51. The encryption code module 53 of security program 51 is then utilized, in accordance with step 173, to encrypt the plain text of header 245 utilizing the shared-secret key 49. Next, in accordance with block 175, the cyphertext of header 245 is then written over the header 245 as received. In other words, a new encrypted header is utilized as a replacement for the encrypted header that was received. Next, in accordance with block 177, control program 221 (as modified) is passed to security processor 25 for further processing. From this point forward, processing occurs in accordance with the prior art associated with security processor 25, as is shown in step 179, control program 221 is decrypted utilizing the shared-secret key 49. Further processing occurs in accordance with step 181 in accordance with the security processor 25 protocol. The process terminates at block 183.

In accordance with the preferred embodiment of the present invention, the key recovery code module 57 of FIG. 3 may be utilized a predetermined and restricted number of times in order to obtain the keys associated with, and carried by, security program 51. In the preferred embodiment of the present invention, key recovery code is itself encrypted utilizing an encryption engine and secret keys in the custody and control of the third party. Accessing the key recovery code will increment a counter or set a bit which either reduces the number of feature attempts to view the key recovery code, or which blocks any future attempt to view the key recovery code. Once the key recovery code is read from security program 51, it may be decrypted utilizing the third party encryption engine and secret keys, and utilize to recover the secret keys carried by security program 51.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A method of communicating digital content between a content provider and a data processing system under the control of a content consumer, over an insecure communication channel, comprising the method steps of:

(a) providing for said data processing system a security processor communicatively coupled to said data processing system for receiving and preprocessing encrypted digital content received from said insecure communication channel;

(b) said security processor including:
   (1) a central processing unit for executing program instructions contained in said digital content;
   (2) a shared-secret decryption engine for receiving shared-secret encrypted content and for utilizing a shared-secret key for producing decrypted digital content from said shared-secret encrypted content;
   (3) memory means for maintaining securely the only copy of said shared-secret key within said security processor;

(c) providing a security program loaded onto said security processor, which is executable by said security processor, and which includes:
   (1) a shared-secret encryption engine for receiving an input and for utilizing said shared-secret key to produce cypheroutput based upon said input;
   (2) a public-private key decryption engine for receiving an encrypted input and utilizing a known public key and a private key to generate a decrypted output;

(d) securing communication over said insecure commercial channel between said security program of digital content utilizing a public-private key encryption protocol, including the step of utilizing said public-private key decryption engine of said security program to receive and decrypt digital content; and (e) securing communication between said security program and said security processor utilizing a shared-secret encryption protocol, including the step of utilizing said shared-secret encryption engine to encrypt said digital decrypted content to allow processing by said security processor wherein a system provided with a shared-secret decryption engine may be utilized with a public-private key protocol.

2. A method according to claim 1, wherein said security processor is restricted in functionality to processing only data processing instructions which have been encrypted utilizing a predetermined cryptographic engine which requires access to a particular shared-secret key which is identified with said security processor which is loaded onto said security processor during the manufacturing process.

3. A method according to claim 2, wherein encrypted digital content which has been encrypted utilizing a key other than said particular shared-secret key is blocked from passage to said data processing system.

4. A method according to claim 1, wherein said shared-secret decryption engine of said security processor comprises a triple-DES encryption engine which utilizes said shared-secret key to perform encryption and decryption operations.

5. A method according to claim 1, whereins said memory means comprises a physical memory which is relatively secure from electrical and mechanical reverse engineering.

6. An apparatus for communicating digital content between a content provider and a data processing system under the control of a content consumer, over an insecure communication channel, comprising:

(a) a security processor communicatively coupled to said data processing system for receiving and preprocessing encrypted digital content received from said insecure communication channel;

(b) said security processor including:
  (1) a central processing unit for executing program instructions contained in said digital content;
  (2) a shared-secret decryption engine for receiving shared-secret encrypted content and for utilizing a shared-secret key for producing decrypted digital content from said shared-secret encrypted content;
  (3) memory means for maintaining securely the only copy of said shared-secret key within said security processor;

(c) a security program loaded onto said security processor, which is executable by said security processor, and which includes:
  (1) a shared-secret encryption engine for receiving an input and for utilizing said shared-secret key to produce cypheroutput based upon said input;
  (2) a public-private key decryption engine for receiving a public-private key encrypted input and utilizing a known public key and a private key to generate a decrypted output;

(d) securing communication over said insecure commercial channel between said security program and said content provider of digital content utilizing a public-private key encryption protocol, including the step of utilizing said public-private key decryption engine of said security program to receive and decrypt digital content; and (e) securing communication between said security program and said security processor utilizing a shared-secret encryption protocol, including the step of utilizing said shared-secret encryption engine to encrypt said decrypted digital content to allow processing by said security processor wherein a system provided with a shared-secret decryption engine may be utilized with a public-private key protocol.

7. An apparatus according to claim 6, wherein said security processor is restricted in functionality to processing only data processing instructions which have been encrypted utilizing a predetermined cryptographic engine which requires access to a particular shared-secret key which is identified with said security processor which is loaded onto said security processor during the manufacturing process.

8. An apparatus method according to claim 7, wherein encrypted digital content which has been encrypted utilizing a key other than said particular shared-secret key is blocked from passage to said data processing system.

9. An apparatus according to claim 6, wherein said shared-secret decryption engine of said security processor comprises a triple-DES encryption engine which utilizes said shared-secret key to perform encryption and decryption operations.

10. An apparatus according to claim 6, whereins said memory means comprises a physical memory which is relatively secure from electrical and mechanical reverse engineering.

* * * * *